United States Patent
Luo

(10) Patent No.: US 10,348,206 B2
(45) Date of Patent: Jul. 9, 2019

(54) CONTROL METHOD, CONTROL CIRCUIT AND SWITCHING POWER SUPPLY WITH THE SAME

(71) Applicant: Silergy Semiconductor Technology (Hangzhou) LTD, Hangzhou, ZheJiang Province (CN)

(72) Inventor: Di Luo, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/977,028

(22) Filed: May 11, 2018

(65) Prior Publication Data
US 2018/0337605 A1    Nov. 22, 2018

(30) Foreign Application Priority Data
May 19, 2017    (CN) .......................... 2017 1 0358026

(51) Int. Cl.
H02M 3/158    (2006.01)
H02M 1/08    (2006.01)
H02M 1/00    (2006.01)

(52) U.S. Cl.
CPC ........... H02M 3/1584 (2013.01); H02M 1/08 (2013.01); *H02M 2001/0009* (2013.01); *H02M 2001/0025* (2013.01)

(58) Field of Classification Search
CPC ........ H02M 1/08; H02M 1/088; H02M 3/158; H02M 3/1584; H02M 2001/0009; H02M 2001/0025; H02M 2003/158; H02M 2003/1584
See application file for complete search history.

(56) References Cited

U.S. PATENT DOCUMENTS

| | | | | |
|---|---|---|---|---|
| 5,680,036 | A * | 10/1997 | Faulk | G05F 1/565 323/282 |
| 7,183,823 | B2 * | 2/2007 | Gibson | H03F 3/217 327/170 |
| 8,115,402 | B2 | 2/2012 | Kuang et al. | |
| 9,054,592 | B2 | 6/2015 | Yao et al. | |
| 9,054,597 | B2 | 6/2015 | Zhao et al. | |
| 9,287,793 | B2 | 3/2016 | Zhang et al. | |
| 9,391,511 | B2 | 7/2016 | Yu et al. | |
| 9,577,533 | B2 | 2/2017 | Yu et al. | |
| 2011/0084677 | A1 | 4/2011 | Sji et al. | |
| 2012/0112795 | A1 | 5/2012 | Wang et al. | |
| 2013/0038302 | A1 | 2/2013 | Qian et al. | |
| 2014/0176107 | A1 * | 6/2014 | Yu | H02M 3/156 323/285 |
| 2015/0077073 | A1 * | 3/2015 | Yu | H02M 3/1584 323/271 |
| 2016/0380530 | A1 * | 12/2016 | Maruyama | H02M 1/4225 323/210 |

* cited by examiner

*Primary Examiner* — Matthew V Nguyen
(74) *Attorney, Agent, or Firm* — Michael C. Stephens, Jr.

(57) ABSTRACT

Controlling a switching power supply can include: generating a ramp signal having an amplitude that follows an output feedback signal of the switching power supply; and controlling a switching state of a main power transistor in the switching power supply to be switched when the ramp signal reaches a peak value such that an output signal of the switching power supply is maintained as substantially constant.

20 Claims, 6 Drawing Sheets

CONTROL METHOD, CONTROL CIRCUIT AND SWITCHING POWER SUPPLY WITH THE SAME

RELATED APPLICATIONS

This application claims the benefit of Chinese Patent Application No. 201710358026.7, filed on May 19, 2017, which is incorporated herein by reference in its entirety.

FIELD OF THE INVENTION

The present invention generally relates to the field of power electronics, and more particularly to control methods and circuits, and to associated switching power supplies.

BACKGROUND

In a switching power supply, in order to reduce the burden on power components, increase the power density, reduce the output voltage ripple, and improve the quality of the output voltage, a multi-channel power stage circuit may be adopted to convert an input voltage to an output voltage in an interleaved manner, where each of the power stage circuits is operated in order. Currently, a control signal of a multi-channel power stage circuit in an interleaved switching power supply may be generated by comparing a ramp signal that is generated based on an inductor current sampling signal and an output error compensation signal against a fixed threshold value. In such a control scheme, a peak value and a valley value of the ramp signal are both fixed values, so the control signal may be unable to respond quickly when the output voltage drops or rises. Thus, the output voltage of the switching power supply may not quickly recover to a desired value.

DETAILED DESCRIPTION

Figure 1:
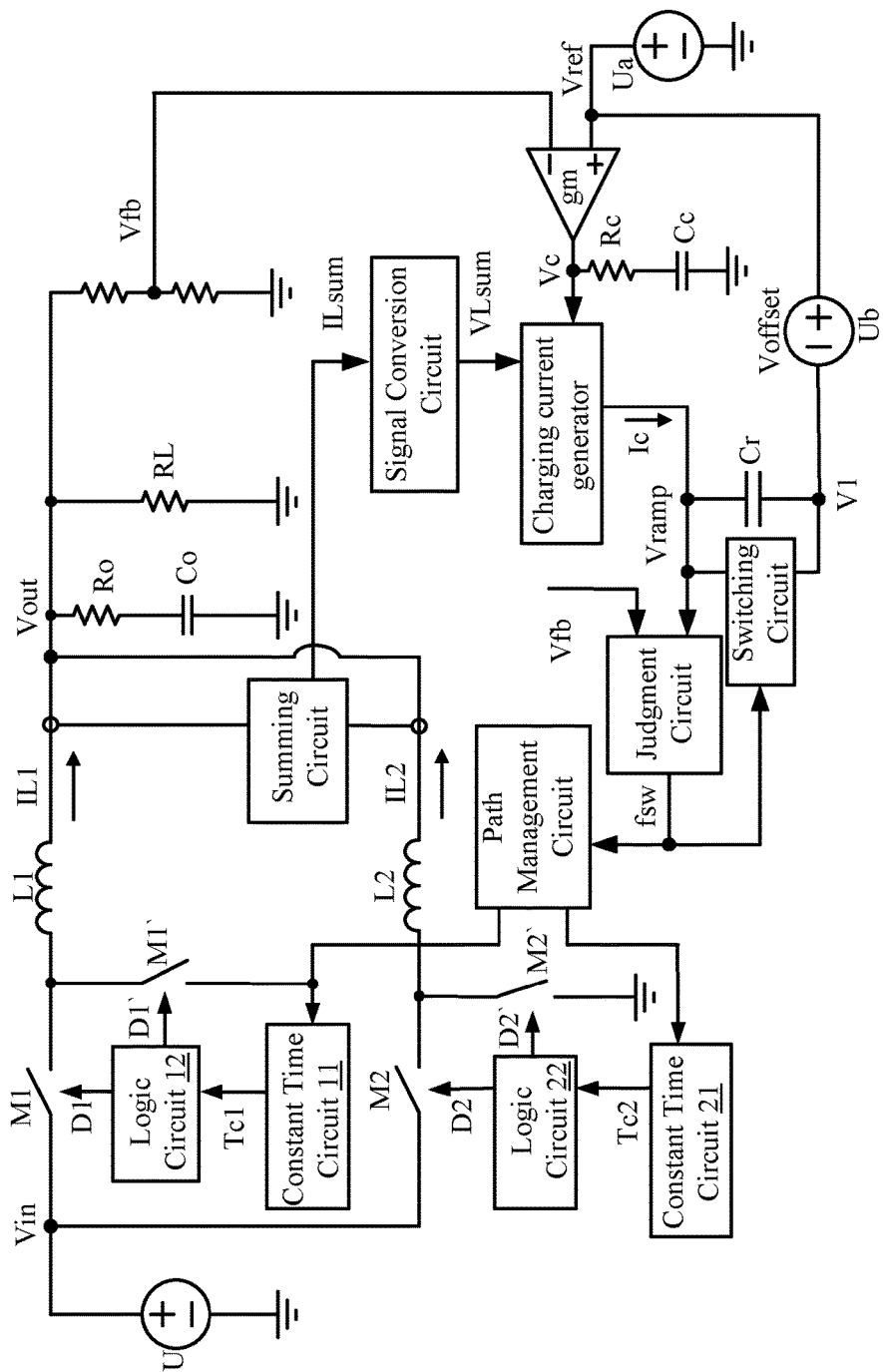
FIG. 1 is a schematic block diagram of a first example switching power supply, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In particular embodiments, in order to increase the response speed of a switching power supply, the switching states of the main power switches may be controlled in the switching power supply, whereby the number of the main power switches is determined by the number of the power stage circuits in the switching power supply. The control method may be applied to control the switching states of the main power switch refers to control one or more of main power switches in the switching power supply. In addition, any suitable topology (e.g., interleaved switching power supply, boost topology, buck topology, a buck-boost topology, etc.) of the switching power supply is supported in certain embodiments.

In particular embodiments, the control method can include generating a ramp signal with its amplitude following an output feedback signal of the switching power supply. For example, one of a peak value and a valley value of the ramp signal may follow the output feedback signal of the switching power supply, while the other is a fixed value. When the ramp signal reaches the peak value, the switching states of the main power switches in the switching power supply can be controlled to be switched, such that an output signal of the switching power supply is maintained as substantially constant. That is, when the output feedback signal is lower than a reference value, the switching states of the main power switches in the switching power supply can be controlled to be switched, in order to increase the duty cycle of the driving signals of the main power switches, and to increase the output feedback signal.

When the output feedback signal is higher than a reference value, the switching states of the main power switches in the switching power supply can be controlled to be switched, in order to reduce the duty cycle of the driving signals of the main power switches, to reduce the output feedback signal, and to control the output feedback signal to be maintained at a predetermined reference value. The output feedback signal of the switching power supply may refer to a feedback signal of the output signal of the switching power supply, which is the output signal of the switching power supply itself, or a parameter that changes along with the output signal of the switching power supply. In particular embodiments, the rising slope of the ramp signal may be a fixed value (e.g., the rising rate is unchanged in each rising stage of the ramp signal).

For example, generating the ramp signal can include generating an error compensation signal of a reference signal and an output feedback signal, generating a sense signal of an inductor current of the switching power supply, and generating a ramp signal according to the compensation signal, the sense signal, and the output feedback signal. The control method may also include making a peak value of the ramp signal follow the output feedback signal, and a valley value of the ramp signal can be set as a fixed first voltage.

When the ramp signal reaches the peak value, the main power switch may be switched from an off state to an on state. The main power switch can be turned from on state to off state after the main power switch remains on for a constant time.

The peak value of the ramp signal may follow the output feedback signal. For example, the peak value of the ramp signal can be made equal to the output feedback signal, and the ramp signal may be generated according to the compensation signal, the sense signal, and the feedback signal. For example, a charging current that represents a difference between the compensation signal and the sense signal can be generated. Also, the voltage at the first terminal of the energy storage element can be made equal to the first voltage. The second terminal of the energy storage element can be charged by the charging current, and the voltage at the second terminal of the energy storage element may be configured as the ramp signal. When the value of the ramp signal reaches the value of the output feedback signal, the first and second terminals of the energy storage element may be shorted, such that the ramp signal is reset to the first voltage and rises again. In order to enhance the change of the ramp signal from the valley value to the peak value when the output feedback signal changes, the valley value of the ramp signal (e.g., the first voltage) may be greater than zero and less than the reference signal.

Particular embodiments may also include making a valley value of the ramp signal follow the output feedback signal, setting the peak value of the ramp signal to a fixed second voltage, and switching the main power switch from on state to off state when the ramp signal reaches the peak value. The main power switch can be turned from an off state to an on state after the main power switch remains off for a constant time. In this example, making the peak value of the ramp signal follow the output feedback signal can include making the peak value of the ramp signal equal to the output feedback signal, and generating the ramp signal according to the compensation signal, the sense signal, and the feedback signal. This can also include generating a charging current that represents a difference between the compensation signal and the sense signal, making the voltage at the first terminal of the energy storage element equal to the output feedback signal, and charging the second terminal of the energy storage element by the charging current. The method can also include taking the voltage at the second terminal as the ramp signal, and coupling the first and second terminals of the energy storage element in short when the ramp signal reaches the second voltage, such that the ramp signal is reset to the output feedback signal and rises again.

The switching power supply can include one or more power stage circuits that are coupled in parallel, where the inductor current of the switching power supply is a total current of the inductor currents in all power stage circuits. A driving signal of the main power switch can be generated in each of the power stage circuit. A switching control signal may be generated according to the relationship between the ramp signal and its peak value. When the ramp signal reaches the peak value, the switching control signal may transition, and the switching control signal can be sequentially distributed to the control loops of the power stage circuits for generating the driving signals. In this way, the switching states of the main power switches can be controlled to be switched in the corresponding power stage circuit.

When the output feedback signal of the switching power supply rises, the time period that the ramp signal rises from the valley value to the peak time can increase. As a result, the duty cycle of the driving signal for controlling the switching state of the main power switch may be reduced, such that the output feedback signal is decreased. Conversely, when the output feedback signal is decreased, the time period that the ramp signal rises from the valley value to the peak value may be decreased, such that the duty cycle of the driving signal for controlling the switching state of the main power transistor increases, and the output feedback signal rises. Therefore, when the load of the switching power supply changes, such as suddenly switching from heavy load to light load or no-load state, or from light load or no load to heavy load state, the output feedback signal may recover to the reference signal quickly, such that the switching power supply has a faster response speed.

Particular embodiments can also include a control circuit for controlling a switching power supply by the above mentioned control method, and a switching power supply with the control circuit. The control circuit can include a ramp circuit and a judgment circuit. The ramp circuit can generate the ramp signal according to the output feedback signal of the switching power supply, and make the amplitude of the ramp signal follow the output feedback signal of the switching power supply. For example, one of the peak value and the valley value of the ramp signal may follow the output feedback signal, while the other can be a fixed value. The judgment circuit can judge whether the ramp signal reaches a peak value and output a switching control signal. When the ramp signal reaches the peak value, the switching control signal transitions to change the switching state of main power switch in the switching power supply, such that an output signal of the switching power supply is maintained as substantially constant.

In the control circuit of particular embodiments, the ramp circuit can include an error compensation circuit, a sampling circuit, and a ramp generating circuit. The error compensation circuit can generate an error compensation signal between the reference signal and the output feedback signal. The sampling circuit can generate a sense signal of the inductor current of the switching power supply. The ramp generating circuit can generate the ramp signal according to the compensation signal, the sense signal, and the output feedback signal. The inductor current of the switching power supply may refer to a total current of the inductor currents in the power stage circuit of the switching power supply. For example, the switching power supply can include a plurality of power stage circuits that are coupled in parallel, and the total current of the inductor currents in the power stage circuits may be the inductor current of the switching power supply.

In the control circuit of particular embodiments, when the peak value of the ramp signal follows the output feedback signal, the valley value of the ramp signal can be set to a fixed first voltage. When the ramp signal reaches the peak value, the switching control signal can control the main power switch to turn from an off state to an on state. When the valley value of the ramp signal follows the output feedback signal, the peak value of the ramp signal may be set to a fixed second voltage. When the ramp signal reaches the peak value, the switching control signal can control the main power switch turn from an off state to an on state. Also, making the peak value or the valley value of the ramp signal follow the output feedback signal can include making the peak value of the ramp signal equal to the output feedback signal.

The control circuit can also include a driving signal generator corresponding to each power stage circuit for generating a driving signal of the main power switch according to the switching control signal. When the switching control signal received by the driving signal generator transitions, the driving signal can control the switching state of the main power switch to be switched. For example, each of the driving signal generators can include a constant time circuit and a logic circuit. The constant time circuit can generate a constant time signal according to the switching control signal. The logic circuit can generate a driving signal according to the constant time signal to control the switching state of the main power switch to be changed again after the constant time since the switching state thereof has switched when the ramp signal reaches the peak value. In addition, the control circuit can include a path management circuit that is configured to receive the switching control signal, and to transmit the switching control signals to the driving signal generation circuits in order, so as to control the switching states of the main power transistors in each power stage circuit to be switched in order.

Referring now to FIG. 1, shown is a schematic block diagram of a first example switching power supply, in accordance with embodiments of the present invention. This particular example can include two interleaved power stage circuits, where the first power stage circuit includes main power switch M1, inductor L1, rectifying device M1', and the second power stage circuit includes main power switch M2, inductor L2, rectifying device M2'. An input terminal of the switching power supply can receive DC input voltage Vin from DC voltage source U, and an output terminal may be coupled to an output filter circuit formed by capacitor Co, resistor Ro, and resistor RL, to generate output voltage Vout. Feedback signal Vfb may be obtained by dividing output voltage Vout via a voltage divider circuit.

In this first example, the error compensation circuit can include a transconductance amplifier gm having a non-inverting input terminal for receiving reference signal Vref, an inverting input terminal for receiving feedback signal Vfb, and an output terminal coupled to a compensation circuit for generating compensation signal Vc. Reference signal Vref can be an output voltage of DC voltage source Ua. The positive pole of DC voltage source Ua can connect to the non-inverting terminal of transconductance amplifier gm, and the negative pole can connect to a reference potential. The compensation circuit can include capacitor Cc and resistor Rc coupled in series between the output terminal of transconductance amplifier gm and the reference potential. The sampling circuit can include a summing circuit and a signal conversion circuit. The summing circuit may generate total current ILsum of the inductor currents in all power stage circuits (e.g., a sum of current IL1 flowing through inductor L1 and current IL2 flowing through inductor L2). The signal conversion circuit can convert total current ILsum to a corresponding voltage signal as sense signal VLsum.

In the first example, the ramp generating circuit can include a charging current generator, an energy storage element, and a switching circuit. The charging current generating circuit may generate charging current Ic that represents a difference between compensation signal Vc and sense signal VLsum. The charging current generator can include a difference circuit and a voltage controlled current source. The difference circuit may obtain the difference between compensation signal Vc and sense signal VLsum. The voltage controlled current source can convert the difference to charging current Ic. In the first example, the energy storage element can be storage capacitor Cr with a first terminal for receiving voltage V1, a second terminal being charged by charging current Ic, and a voltage at the second terminal of storage capacitor Cr being configured as ramp signal Vramp.

The switching circuit may be coupled between the first and second terminals of storage capacitor Cr, and can be controlled by switching control signal fsw. The switching circuit can include a transistor coupled between the first and second terminals of storage capacitor Cr. The judgment circuit can receive feedback signal Vfb and ramp signal Vramp, and may generate switching control signal fsw. For example, the judgment circuit can be a comparator with a non-inverting input terminal for receiving ramp signal Vramp, an inverting input terminal for receiving feedback signal Vfb, and an output terminal for generating switching control signal fsw. In this particular example, feedback signal Vfb may be taken as the peak value of the ramp signal Vramp, and voltage V1 is taken as the valley value of the ramp signal, and storage capacitor Cr can be charged by charging current Ic, thereby causing ramp signal Vramp to rise.

When ramp signal Vramp rises to feedback signal Vfb, switching control signal fsw may pulse or spike (e.g., transitions from the first state to the second state and recover to the first state immediately to form a very short pulse or signal spike). In this example, the first state is a low level and the second state is a high level. At the moment when switching control signal fsw transitions, the switching circuit may be turned on, such that the first and second terminals of storage capacitor Cr may be short-circuited. After the moment, switching control signal fsw can recover to the first state immediately. Thus, the switching circuit can be turned off immediately after being turned on, such that the ramp signal is reset to voltage V1 and rises again. For example, voltage V1 is a voltage greater than 0 and less than reference signal Vref. Generating voltage V1 can include coupling DC voltage source Ub with its value of Voffset between the positive pole of DC voltage source Ua and the first terminal of storage capacitor Cr. The positive poles of DC voltage source Ub and DC voltage source Ua can be coupled together, and the negative pole may be coupled to the first terminal of storage capacitor Cr, such the difference between reference signal Vref and voltage Voffset is voltage V1.

The driving signal generator corresponding to the first power stage circuit can generate driving control signal D1 for controlling main power switch M1, and driving control signal D1' for controlling rectifying device M1'. The driving signal generator can include logic circuit 12 and constant time circuit 11, where driving control signal D1 is opposite to driving control signal D1'. The driving signal generator corresponding to the second power stage circuit can generate driving control signal D2 for controlling main power switch M2, and driving control signal D2' for controlling rectifying device M2'. The driving signal generator can include logic circuit 22 and constant time circuit 21, where driving control signal D2 is opposite to driving control signal D2'.

In the first example, constant time circuits 11 and 21 are constant on time circuits such that the control method of the switching power supply is a constant on time control method. The control method can include receiving switching control signal fsw by the path management circuit, and distributing the switching control signal to the driving signal generators in order. For example, if the transition of the switching control signal fsw occurs at the first time, driving signal D1 can control main power switch M1 to be switched from the off state to the on state, and the path management circuit may distribute switching control signal fsw to constant time circuit 11. As such, switching control signal fsw can begin controlling constant time circuit 11 to generate constant on time signal Tc1. Logic circuit 12 may receive constant on time signal Tc1, and generate driving signal D1, thus main power switch M1 can be turned off after being on for a constant time.

If the transition or short pulse or spike of switching control signal fsw occurs at the second time, driving signal D2 can control main power switch M2 to be switched from an off state to an on state, and the path management circuit may distribute switching control signal fsw to constant time circuit 21. As such, switching control signal fsw may begin controlling constant time circuit 21 to generate constant on time signal Tc2. Logic circuit 22 can receive constant on time signal Tc2, and may generate driving signal D2. Thus, main power switch M2 may be turned off after being on for a constant time. When the transition/spike of switching control signal fsw occurs at the third time, the path management circuit may distribute switching control signal fsw to constant time circuit 11. When the transition/spike of switching control signal fsw occurs at the fourth time, the path management circuit may distribute switching control signal fsw to constant time circuit 21, and so on.

Figure 3:
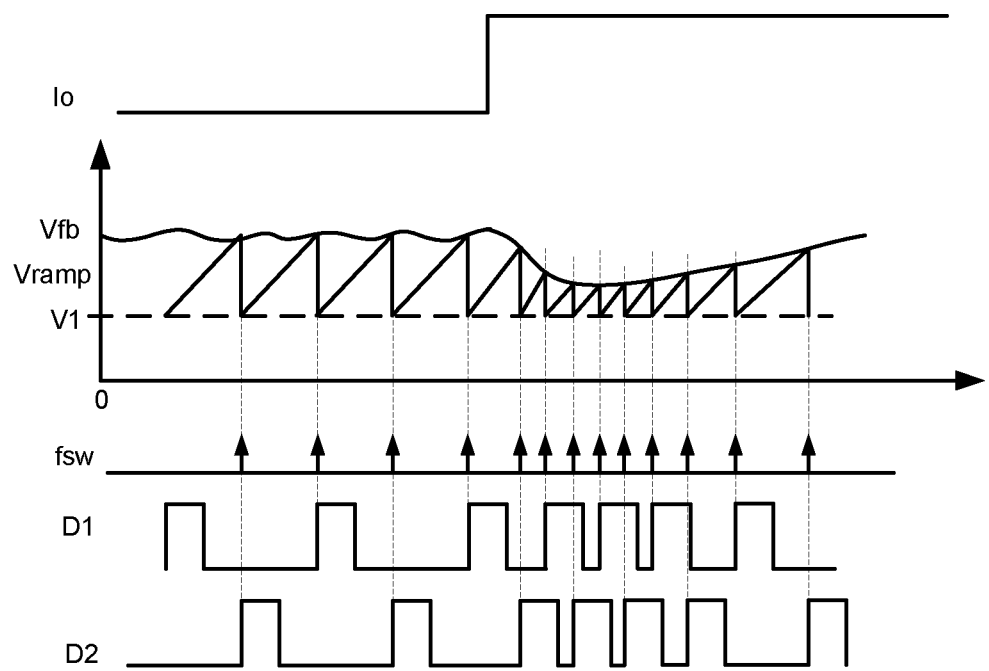
FIG. 3 is a waveform diagram of example operation of the switching power supply of FIG. 1 in a condition when the load is heavier, in accordance with embodiments of the present invention.

Referring now to FIG. 3, shown is a waveform diagram of example operation of the switching power supply of FIG. 1 in a condition when the load is heavier, in accordance with embodiments of the present invention. In this particular example, in the switching power supply of FIG. 1, output feedback signal Vfb may be taken as the peak value of ramp signal Vramp, and voltage V1 may be taken as the valley value of the ramp signal. When the load is getting heavier, output current Io of the switching power supply can increase, output voltage Vout may decrease, and output feedback signal Vfb can also decrease to be lower than reference signal Vref. Charging current Ic for charging storage capacitor Cr may not change immediately when output feedback signal Vfb decreases, and instead charging current Ic may remain at the fixed value. Thus, the rising slope of ramp signal Vramp may not change, and the time period that ramp signal Vramp rises from the valley value to the peak value can decrease along with output feedback signal Vfb.

Also, the time period between two spikes of switching control signal fsw may decrease along with output feedback signal Vfb. Thus, the time period between two adjacent spikes in which driving signal D1 is switched from the inactive state (e.g., controlling main power switch M1 to turn off) to the active state (e.g., controlling main power switch M1 to turn on) may decrease along with output feedback signal Vfb. Also, the time period between two adjacent transitions that driving signal D2 is switched from the inactive state (e.g., controlling main power switch M2 to turn off) to the active state (e.g., controlling main power switch M2 to turn on) may decrease along with output feedback signal Vfb. Because main power switches M1 and M2 are both controlled in constant on time mode, the duty cycle of driving signals D1 and D2 may increase while output feedback signal Vfb decreases, such that output feedback signal Vfb may increase and quickly recover to reference signal Vref.

Figure 4:
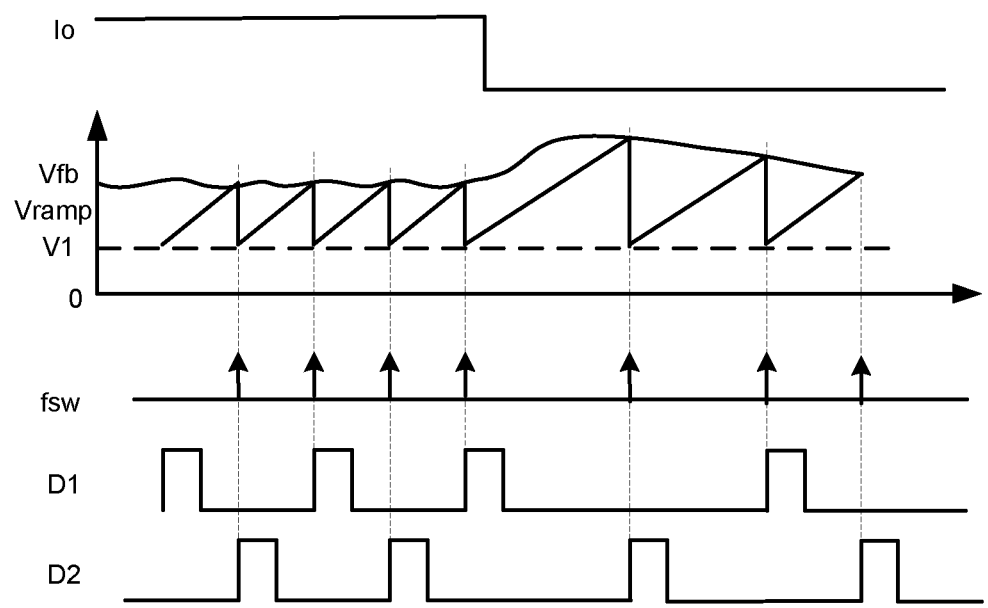
FIG. 4 is a waveform diagram of example operation of the switching power supply of FIG. 1 in a condition when the load is lighter, in accordance with embodiments of the present invention.

Referring now to FIG. 4, shown is a waveform diagram of example operation of the switching power supply of FIG. 1 in a condition when the load is lighter, in accordance with embodiments of the present invention. In this particular example, output feedback signal Vfb is taken as the peak value of ramp signal Vramp, and voltage V1 is taken as the valley value of the ramp signal. When the load is getting lighter, output current Io of the switching power supply may decrease, output voltage Vout may increase, and output feedback signal Vfb may also increase to be greater than reference signal Vref. Charging current Ic for charging storage capacitor Cr may not change immediately when output feedback signal Vfb increases, and instead charging current Ic may remain at the fixed value, such that the rising slope of the ramp signal does not change. Also, the time period that ramp signal Vramp rises from the valley value to the peak value may increase along with output feedback signal Vfb, and the time period between two transitions/spikes/pulses of switching control signal fsw may increase along with output feedback signal Vfb.

Thus the time period between two adjacent pulses in which driving signal D1 is switched from the inactive state (e.g., controlling main power switch M1 to turn off) to the active state (e.g., controlling main power switch M1 to turn on) may increase along with output feedback signal Vfb, and the time period between two adjacent transitions that driving signal D2 is switched from the inactive state (e.g., controlling main power switch M2 to turn off) to the active state (e.g., controlling main power switch M2 to turn on) may increase along with output feedback signal Vfb. Because main power switches M1 and M2 are both controlled in constant on time mode, the duty cycle of driving signals D1 and D2 may decrease while output feedback signal Vfb increases, such that output feedback signal Vfb may decrease and quickly recover to reference signal Vref.

Figure 2:
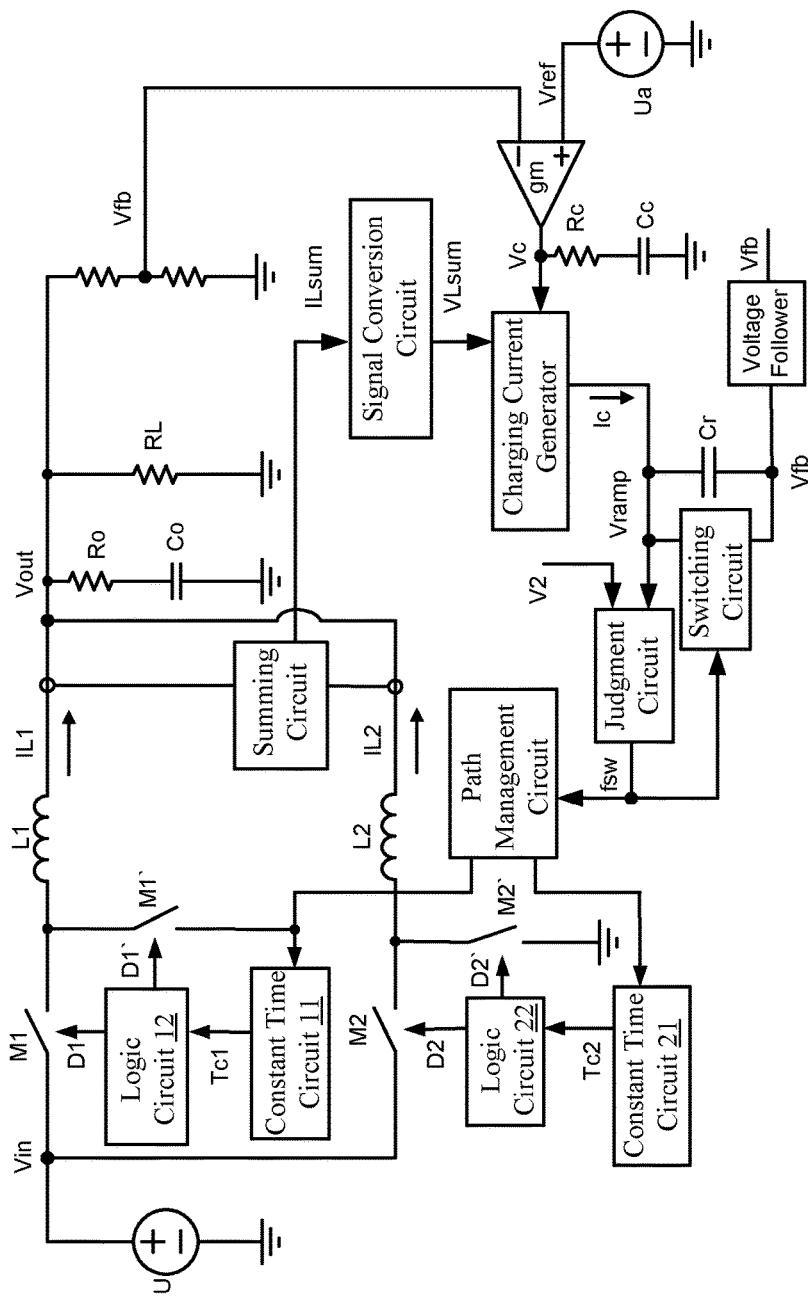
FIG. 2 is a schematic block diagram of a second example switching power supply, in accordance with embodiments of the present invention.

Referring now to FIG. 2, shown is a schematic block diagram of a second example switching power supply, in accordance with embodiments of the present invention. The main difference between the switching power supplies in this second example (FIG. 2) and the first example (FIG. 1) is that the control mode of the switching power supply in the second example is a constant off time mode, while that of the first example is a constant on time mode. In the second example, output feedback signal Vfb is taken as the valley value of ramp signal Vramp, and fixed voltage V2 is taken as the peak value of the ramp signal. In FIG. 2, output feedback signal Vfb may be received at the first terminal of storage capacitor Cr. When ramp signal Vramp reaches voltage V2, switching control signal fsw can control the switching circuit to turn on, so as to couple the first and second terminals of storage capacitor Cr in short, and ramp signal Vramp may be reset to output feedback signal Vfb and then rises again.

Furthermore, the inverting input terminal of a comparator being used as the judgment circuit can receive voltage V2, and constant time circuits 11 and 21 may both be constant off time circuits. When a transition/pulse of switching control signal fsw received by one of constant time circuits 11 and 21 occurs, constant off time signal Tc1 or Tc2 can be generated, such that the main power switch is turned from an on state to an off state, and is further turned from an off state to an on state after a constant time. In the second example, output feedback signal Vfb can be transmitted to the first terminal of storage capacitor Cr through a voltage follower, in order to improve the stability of the circuit.

Figure 5:
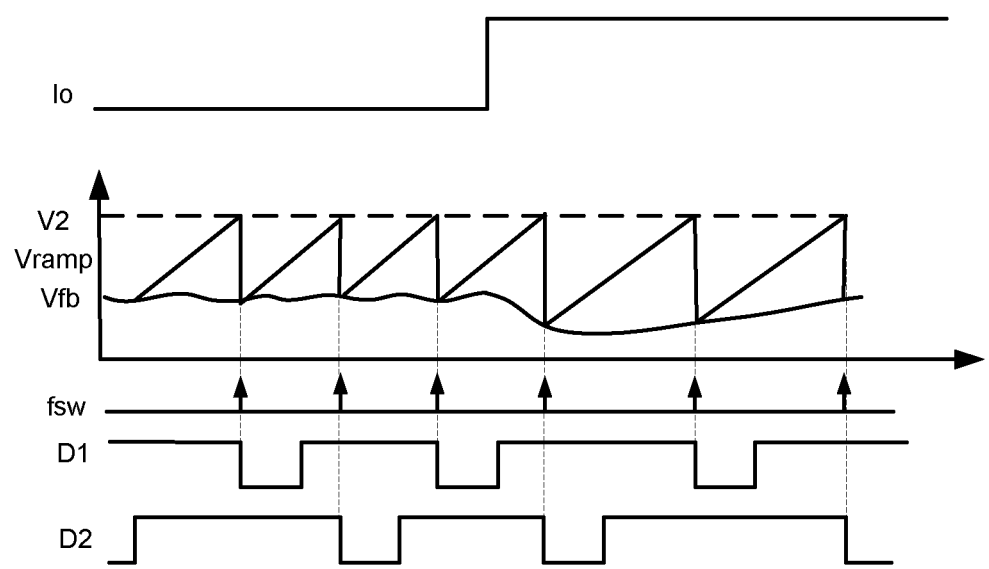
FIG. 5 is a waveform diagram of example operation of the switching power supply of FIG. 2 in a condition when the load is heavier, in accordance with embodiments of the present invention.

Referring now to FIG. 5, shown is a waveform diagram of example operation of the switching power supply of FIG. 2 in a condition when the load is heavier, in accordance with embodiments of the present invention. In this particular example, output feedback signal Vfb may be taken as the valley value of ramp signal Vramp, and voltage V2 can be taken as the peak value of the ramp signal. When the load is getting heavier, output current Io of the switching power supply can increase, output voltage Vout may decrease, and output feedback signal Vfb may also decrease to be lower than reference signal Vref. Charging current Ic for charging storage capacitor Cr may not change immediately when output feedback signal Vfb decreases, and instead charging current Ic can remain at the fixed value. As such the rising slope of the ramp signal may not change, and the time period that ramp signal Vramp rises from the valley value to the peak value can increase while output feedback signal Vfb decreases.

The time period between two transitions or pulses of switching control signal fsw may increase while output feedback signal Vfb decreases. Thus, the time period between two adjacent transitions in which driving signal D1 can switched from the active state (e.g., controlling main power switch M1 to turn on) to the inactive state (e.g., controlling main power switch M1 to turn off) may increase while output feedback signal Vfb decreases. Also, the time period between two adjacent transitions that driving signal D2 is switched from the active state (e.g., controlling the main power switch M2 to turn on) to the inactive state (e.g., controlling main power switch M2 to turn off) can increase while output feedback signal Vfb decreases. Because main power switches M1 and M2 are both controlled in constant off time mode in this example, the duty cycle of driving signals D1 and D2 may increase while output feedback signal Vfb decreases, such that output feedback signal Vfb may increase and quickly recover to reference signal Vref.

Figure 6:
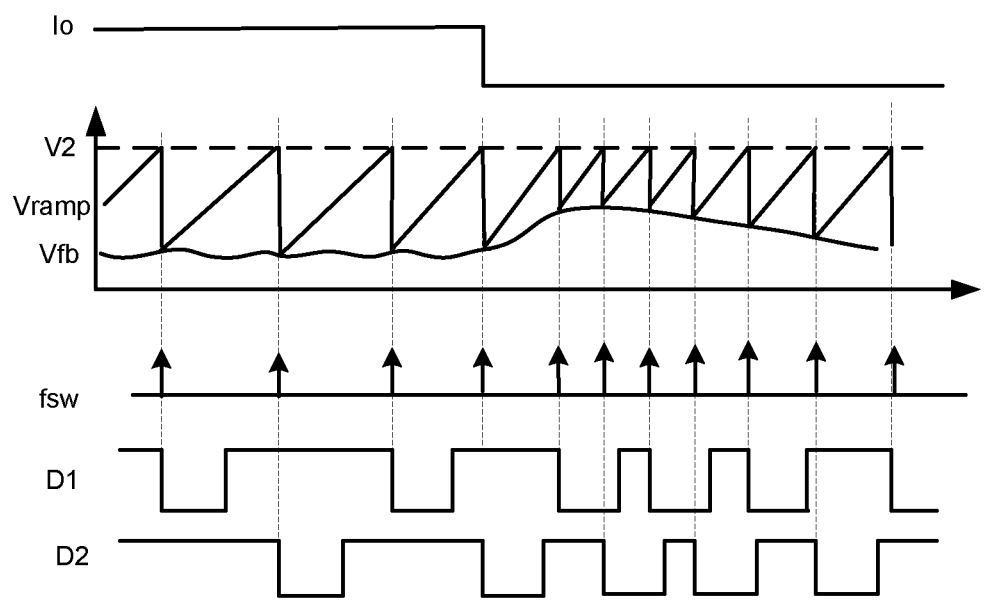
FIG. 6 is a waveform diagram of example operation of the switching power supply of FIG. 2 in a condition when the load is lighter, in accordance with embodiments of the present invention.

Referring now to FIG. 6, shown is a waveform diagram of example operation of the switching power supply of FIG. 2 in a condition when the load is lighter, in accordance with embodiments of the present invention. In this particular example, output feedback signal Vfb may be taken as the valley value of ramp signal Vramp, and voltage V2 taken as the peak value of the ramp signal. When the load is getting lighter, output current Io of the switching power supply can decrease, output voltage Vout may increase, and output feedback signal Vfb may also increase to be greater than reference signal Vref. Charging current Ic for charging storage capacitor Cr may not change immediately when output feedback signal Vfb increases, and instead charging current Ic can remain at the fixed value, such that the rising slope of the ramp signal does not change. Also, the time period that ramp signal Vramp rises from the valley value to the peak value may decrease while output feedback signal Vfb increases, and the time period between two pulses of switching control signal fsw can increase along with output feedback signal Vfb.

Thus, the time period between two adjacent transitions/pulses in which the driving signal D1 is switched from the active state (e.g., controlling main power switch M1 to turn on) to the inactive state (e.g., controlling main power switch M1 to turn off) may increase along with output feedback signal Vfb. Also, the time period between two adjacent transitions in which driving signal D2 is switched from the active state (e.g., controlling the main power switch M2 to turn on) to the inactive state (e.g., controlling main power switch M2 to turn off) can increase along with output feedback signal Vfb. Because main power switches M1 and M2 are both controlled in constant off time mode in this example, the duty cycle of driving signals D1 and D2 may decrease while output feedback signal Vfb increases, such that output feedback signal Vfb may decrease and quickly recover to reference signal Vref.

When the output feedback signal of the switching power supply rises, the time period that the ramp signal rises from the valley value to the peak time may increase. As a result, the duty cycle of the driving signal for controlling the switching state of the main power switch can be reduced, such that the output feedback signal is decreased. Conversely, when the output feedback signal is decreased, the time period that the ramp signal rises from the valley value to the peak value may be decreased, such that the duty cycle of the driving signal for controlling the switching state of the main power transistor increases, and the output feedback signal rises. Therefore, when the load of the switching power supply changes, such as suddenly switching from heavy load to light load or no-load, or from light load or no load to heavy load state, the output feedback signal may quickly recover to the reference signal, such that the switching power supply has a faster response speed as compared to other approaches.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a switching power supply, the method comprising:
   a) generating an error compensation signal of a reference signal and an output feedback signal of said switching power supply;
   b) generating a ramp signal according to said error compensation signal, said ramp signal having an amplitude that follows an varies between a fixed voltage and said output feedback signal; and
   c) controlling a switching state of a main power transistor in said switching power supply to be switched in accordance with said ramp signal, wherein said switching state of said main power transistor is changed when said ramp signal reaches a peak value such that an output signal of said switching power supply is maintained as substantially constant.

2. The method of claim 1, wherein said generating said ramp signal comprising:
   a) generating a sense signal of an inductor current of said switching power supply; and
   b) generating said ramp signal according to said compensation signal, said sense signal, and said output feedback signal.

3. The method of claim 2, wherein:
   a) said peak value of said ramp signal follows said output feedback signal, and a valley value of said ramp signal is set as a fixed first voltage; and
   b) said main power switch is switched from an off state to an on state when said ramp signal reaches said peak value.

4. The method of claim 3, wherein generating said ramp signal according to said compensation signal, said sense signal, and said output feedback signal comprises:
   a) generating a charging current that represents a difference between said compensation signal and said sense signal;
   b) making a voltage at a first terminal of an energy storage element equal to said first voltage;
   c) charging a second terminal of said energy storage element by said charging current, and taking a voltage at said second terminal of said energy storage element as said ramp signal; and
   d) when said ramp signal reaches said output feedback signal, coupling said first and second terminals of said energy storage element in short, such that said ramp signal is reset to said first voltage and rises again.

5. The method of claim 2, further comprising:
   a) making a valley value of said ramp signal follow said output feedback signal;
   b) setting said peak value of said ramp signal to a fixed second voltage; and
   c) switching said main power transistor from an on state to an off state when said ramp signal reaches said peak value.

6. The method of claim 5, wherein generating said ramp signal according to said compensation signal, said sense signal, and said output feedback signal comprises:
   a) generating a charging current that represents a difference between said compensation signal and said sense signal;
   b) making said voltage at said first terminal of said energy storage element equal to said output feedback signal;
   c) charging said second terminal of said energy storage element by said charging current, and taking said voltage at said second terminal of said energy storage element as said ramp signal; and
   d) when said value of said ramp signal reaches said value of said second voltage, coupling said first and second terminals of said energy storage element in short, such that said ramp signal is reset to said output feedback signal and rises again.

7. The method of claim 2, wherein said switching power supply comprising one or more power stage circuits that are coupled in parallel, and wherein said inductor current of said switching power supply is a total current of said inductor currents in all of said one or more power stage circuits.

8. The method of claim 7, wherein when said ramp signal reaches said peak value, a transition of said switching control signal occurs, and said switching control signals are sequentially distributed to each of said power stage circuits, such that said switching states of said main power transistors in said power stage circuits are switched in order.

9. The method of claim 1, wherein said switching state of said main power transistor is switched when said ramp signal reaches said peak value, and is switched again after a constant time.

10. A control circuit of a switching power supply, the control circuit comprising:
   a) a ramp circuit configured to generate a ramp signal according to an error compensation signal of a reference signal and an output feedback signal of said switching power supply, wherein an amplitude of said ramp signal varies between a fixed voltage and said output feedback signal;
   b) a judgment circuit configured to generate a switching control signal for changing the switching state of a main power transistor in accordance with said ramp signal; and
   c) when said ramp signal reaches said peak value, said switching control signal being configured to pulse in order to change the switching state of said main power transistor in said switching power supply, such that an output signal of said switching power supply is maintained as substantially constant.

11. The control circuit of claim 10, wherein said ramp circuit comprises:
   a) an error compensation circuit configured to generate said error compensation signal;
   b) a sampling circuit configured to generate a sense signal of an inductor current in said switching power supply; and c) a ramp generating circuit configured to generate said ramp signal according to said compensation signal, said sense signal, and said output feedback signal.

12. The control circuit of claim 11, wherein:
   a) said peak value of said ramp signal follows said output feedback signal;
   b) a valley value of said ramp signal is set to a fixed first voltage; and
   c) when said ramp signal reaches said peak value, said switching control signal controls said main power switch to switch from an off state to an on state.

13. The control circuit of claim 12, wherein said ramp generating circuit comprises:
   a) a charging current generator configured to generate a charging current that represents a difference between said compensation signal and said sense signal;
   b) an energy storage element having a first terminal for receiving said first voltage, a second terminal being charged by said charging current, wherein a voltage at said second terminal of said energy storage element is taken as said ramp signal;
   c) a switching circuit coupled between said first and second terminals of said energy storage element, and being controlled by said switching control signal; and
   d) when said ramp signal reaches said output feedback signal, said switching control signal is configured to control said switching circuit to turn on, and to couple said first and second terminals of said energy storage element in short, such that said ramp signal is reset to said first voltage and rises again.

14. The control circuit of claim 11, wherein:
   a) a valley value of said ramp signal follows said output feedback signal;
   b) said peak value of said ramp signal is set to a fixed second voltage; and
   c) when said ramp signal reaches said peak value, said switching control signal controls said main power switch to switch from an on state to an off state.

15. The control circuit of claim 14, wherein said ramp generating circuit comprises:
   a) a charging current generator configured to generate a charging current that represents a difference between said compensation signal and said sense signal;
   b) an energy storage element having a first terminal for receiving said output feedback signal, and a second terminal being charged by said charging current, wherein a voltage at said second terminal of said energy storage element is taken as said ramp signal;
   c) a switching circuit coupled between said first and second terminals of said energy storage element, and being controlled by said switching control signal; and
   d) when said ramp signal reaches said second voltage, said switching control signal is configured said switching circuit to turn on, and to coupled said first and second terminals of said energy storage element in short, such that said ramp signal is reset to said output feedback signal and rises again.

16. The control circuit of claim 11, wherein said switching power supply comprising one or more power stage circuits that are coupled in parallel, and where said inductor current of said switching power supply is a total current of said inductor currents in all of said one or more power stage circuits.

17. The control circuit of claim 16, further comprising:
   a) a driving signal generator corresponding to each of said power stage circuits, and being configured to generate driving signals of said main power transistor according to said switching control signal; and b) when said switching control signal received by said driving signal generator transitions, said driving signal controls said switching state of said main power transistor to be switched.

18. The control circuit of claim 17, further comprising a path management circuit configured to receive said switching control signal, and to transmit said switching control signals to each of said driving signal generator in order, so as to control the switching state of said main power transistors in each power stage circuit to be switched.

19. The control circuit of claim 18, wherein said driving signal generator comprises:

a) a constant time circuit configured to generate a constant time signal according to said switching control signal; and b) a logic circuit configured to generate said driving signal according to said constant time signal, in order to control the switching state of said main power transistor to be switched again after a constant time since said switching state is switched when said ramp signal reaches said peak value.

20. The control circuit of claim 11, wherein said sampling circuit comprises:

a) a summing circuit configured to generate a total current of inductor currents in all power stage circuits; and b) a signal conversion circuit configured to convert a current signal generated by said summing circuit to a voltage signal, wherein said voltage signal is taken as said sense signal.

* * * * *